United States Patent [19]

Cleereman et al.

[11] Patent Number: 4,510,108

[45] Date of Patent: Apr. 9, 1985

[54] METHOD OF FORMING BLANKS FOR THE SOLID-PHASE FORMING OF THERMOPLASTIC ARTICLES

[75] Inventors: Kenneth J. Cleereman, Salida, Colo.; O. Carl Raspor, Saginaw; Alan F. Burmester, Midland, both of Mich.

[73] Assignee: The Dow Chemical Company, Midland, Mich.

[21] Appl. No.: 427,232

[22] Filed: Sep. 29, 1982

[51] Int. Cl.³ .............................................. B29C 25/00
[52] U.S. Cl. ................................... 264/119; 264/120; 264/235; 264/294
[58] Field of Search ............... 264/119, 235, 294, 319, 264/322, DIG. 65, DIG. 66, 120, 331.17; 425/DIG. 39

[56] References Cited

U.S. PATENT DOCUMENTS

| | | | |
|---|---|---|---|
| 3,286,008 | 11/1966 | Power et al. | 264/319 |
| 4,014,965 | 3/1977 | Stube et al. | 264/119 |
| 4,161,502 | 7/1979 | Wessling et al. | 264/120 |
| 4,323,531 | 4/1982 | Bradley et al. | 264/119 |

Primary Examiner—Donald Czaja
Assistant Examiner—V. Fischbach
Attorney, Agent, or Firm—L. E. Hessenaur, Jr.

[57] ABSTRACT

An improved, essentially scrap-free, solid-phase process for making thermoplastic articles directly from resinous powder. The process can be particularly advantageous to forming large parts from thermoplastic resinous powders. The method essentially comprises taking resinous powder, briquetting the powder, sintering the briquette, repressing the powder in a warm state and then shaping the briquette into a preform or a blank which can then be thermoformed into a resulting container or other product, assuming the blank itself is not the desired end product. Alternatively, sintering can take place after repressing with preheating of the briquette prior to the repressing step.

11 Claims, 6 Drawing Figures

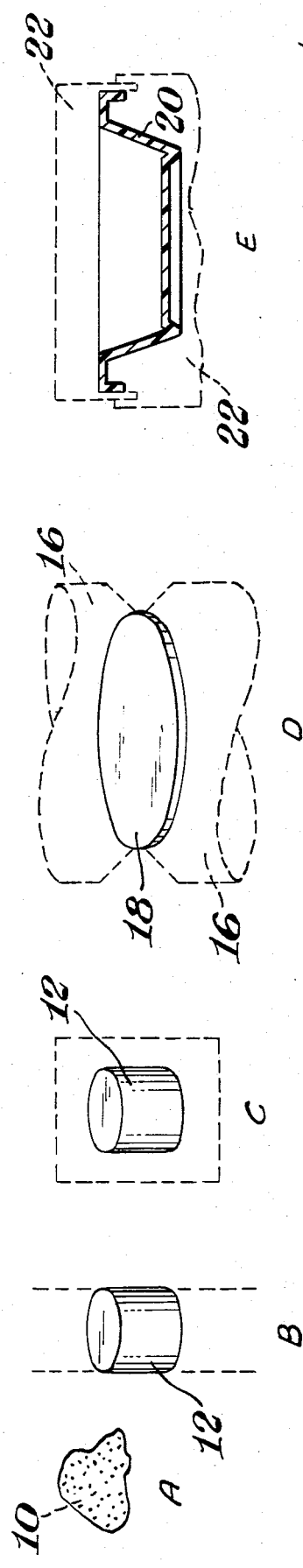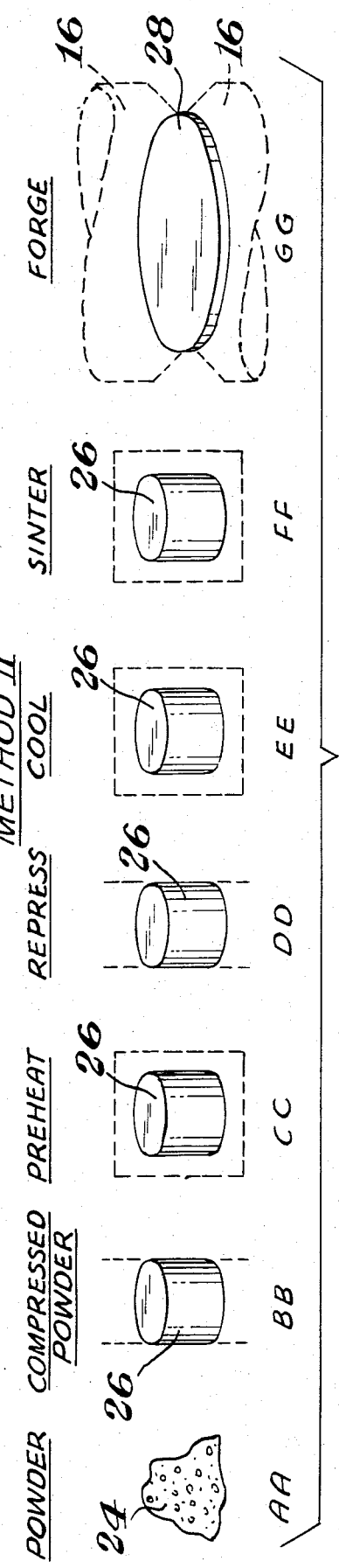

METHOD OF FORMING BLANKS FOR THE SOLID-PHASE FORMING OF THERMOPLASTIC ARTICLES

BACKGROUND OF THE INVENTION

This invention is an improvement on the process disclosed in the U.S. Pat. No. 4,323,531 one of the co-inventors thereof being a co-inventor of the present application. U.S. Pat. No. 4,323,531 concerns itself with the forming of thermoplastic articles from a polymeric resinous powder which is compressed into a briquette, sintered and then forged and, if desired, formed into an article so that the process is essentially scrap-free, and the need to go through a melt-forming stage is avoided. While the aforesaid process can readily form satisfactory products from most thermoplastic resinous powders, some difficulty in doing so at acceptable production speeds with some resinous powders and for large parts can be experienced. The present invention improves the process so that forging of briquettes into preforms which have essentially no voids, cracks or defects and have the prerequisite toughness can be accomplished with satisfactory rapidity even with large parts. By this invention, an improved essentially scrapless process is provided which can simplify the steps of the operation of forming. Thermoplastic resinous powders can be formed by this process at production speeds directly into products of high quality even where the resinous powders are basically difficult to form.

SUMMARY OF THE INVENTION

The present invention comprises a process for forming thermoplastic resinous powders directly into products at production speeds without requiring processing through a complete melt stage. One particular advantage of the present process is that large parts can be readily manufactured. The steps of the process include the formation of a briquette from a sufficient quantity of thermoplastic polymeric resinous powder for making the desired article, compressing the powder into a briquette, sintering the briquette for a time and temperature to accomplish more than about 20 percent melting but less than about 90 percent melting of the crystallinity of the original resinous powder, recompressing the briquette in warm, preferably vented tooling and forging the briquette into a preform which is then thermoformable by standard thermoforming techniques into a finished article, unless the resulting preform is already in the configuration of the final article desired. The percent melting in the sintering step should be from about 20 percent to about 90 percent while the preferred range of melting in sintering step can be about 40 to about 80 percent. The powder which is briquetted can be at room temperature or can be preheated where it is determined that such will accelerate the total processing operation. In one alternate method of the invention, sintering can take place after recompressing, with preheating of the briquette prior to the recompressing step.

BRIEF DESCRIPTION OF THE DRAWING

FIG. 1 is a diagrammatic representation of the steps of the prior invention over which this present invention is an improvement. The steps of the invention, being designated A through E, whereby powder resin is formed into a preform and then into a container.

FIG. 2 is a similar diagrammatic representation of the steps of the present invention here designated as AA through GG, whereby powder resin can also be formed into preforms and subsequently into containers as in Step E of FIG. 1, if desired.

DETAILED DESCRIPTION OF THE PREFERRED EMBODIMENTS OF THE PRESENT INVENTION

Figure 3:
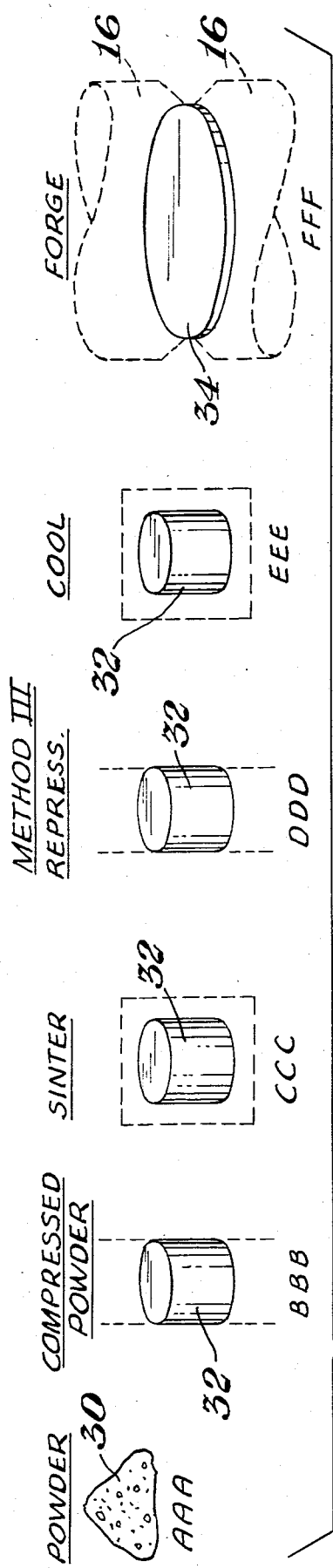
FIG. 3 is a similar diagrammatic representation of the steps of a modified process of this invention hereby designated as steps AAA through FFF. Subsequent thermoforming into containers can also be achieved as in Step E of FIG. 1, if desired.

For the purposes of the present invention, terms used in this application shall have the following meanings:

"Sintering" is the process by which an assembly of particles, compacted under pressure, physically and/or chemically bond themselves across contacting particle interfaces or boundaries into a coherent body under the influence of elevated temperature for a period of time, without complete melting generally occurring.

"Forging" is the process whereby resin particles are fused into a preform or article which has generally the same density and generally the same or improved mechanical properties that it would have if made by conventional melt forming processes.

"Plug flow" is the condition by which the briquette deforms in an essentially multi-axial stretching mode such that the velocity gradient through the thickness of the material is relatively constant. This is in contrast to the usual parabolic flow pattern observed in conventional molding of polymers in a viscous state, where the velocity varies from zero at the mold surface to a maximum near the mold center. Plug flow is the condition where the relative constant velocity through the thickness of the material is achieved by reducing the frictional drag at the mold surface. This can be conveniently accomplished by placing a lubricant between the briquette and the contacting metal surfaces since few presently known resins are sufficiently self-lubricating for this purpose.

"Green strength" means having a compactness and adhesion of resinous powder sufficient to enable the powder to be moved as a unit without support.

"Crystallinity" means the extent to which the material in a given sample is arranged in generally regular, periodic arrays, commonly known as crystals. Determinations of crystallinity are usually made by measurement of sample density, heat absorbed on melting, or intensity of discrete x-ray diffraction patterns.

"Degree of melting" means the percentage of the original crystallinity in a crystalline thermoplastic which is melted during a heat treating step. For example, an unheated specimen will have a degree of melting equal to zero percent while a completely melted specimen will have a degree of melting equal to 100 percent.

"Repressing" or "recompressing" means a recompaction of the powder resin without significant deformation of the original briquette which was initially compacted into a briquette, the material of the briquette, while warm, being further densified during such recompaction.

"Melting point" or "peak melt temperature" (Tp) means that temperature indicated by the maximum in the melting endothermic peak as seen in the customary differential scanning calorimeter (DSC) measurement.

"Alpha transition temperature" (Tα) for amorphous polymers is considered to be the glass transition. In the case of crystalline polymers, it is taken as an energy loss peak associated with the crystalline region often observed about 50° C. to 100° C. below the melting point of the polymer.

"Preheating" means heating a briquette at a temperature below $T_p$, preferably such that little or no melting of the crystal structures of the powder resin occurs.

FIG. 1 is a schematic depiction of a solid phase process for forming preforms directly from resinous powder 10 as described in detail in U.S. Pat. No. 4,323,531, which is herewith incorporated in full by reference. For purposes of this description, such process is identified as Method I. Briefly, a quantity of powder 10 sufficient to make a finished product is measured at Step A and is thereafter compressed in Step B into a briquette 12. The briquette which is heated in Step C to a temperature in the range from about the alpha transition temperature to less than the melt temperature thereof and is thereafter maintained at that temperature for a period sufficient to soften the briquette and sinter the same short of substantial fusion thereof. The briquette 12 is then forged in Step D between platens 16 into a preform 18 (or a final product where the preform can take the shape of the finished article desired) while the briquette is at a temperature within the above temperature range to affect substantial plug flow deformation of the briquette and obtain substantial fusion of the powder comprising the briquette which forms a preform or a final product. If formed as a preform, the preform 18 can then be transferred to thermoforming dies 20 and can then be formed into a container 22 or other product by conventional thermoforming techniques as illustrated at Step E and described in U.S. Pat. No. 4,323,531.

While Method I works fine for some materials, it has been found to have some limitations in forming products from certain resinous powders. Some materials are difficult to compact into a briquette. Some develop voids during forging. Long heating times are required because of resin expansion before densification of the resin particles. The process of Method I can sometimes be slower than desired for production applications. The processes of the present invention, hereafter described, have been able to accomplish the formability of such difficult-to-handle thermoplastic materials or especially large parts while at the same time speeding up the forming process.

One embodiment of the steps of the process of the present invention is illustrated as Method II in FIG. 2. In Method II an amount of loose resinous powder 24 sufficient to form a desired article is collected at Step AA. This powder can be at room temperature. It can then be compacted into a briquette 26 having green strength at Step BB using room temperature compaction tooling. Compaction pressures and compaction dwell times are basically the same as those used for the prior art; Method I of FIG. 1. The briquette is then placed into an environment for heating, such as a circulating air oven or an infra-red oven or a radio frequency heater, where it is preheated at Step CC. When the center temperature of the briquette 26 preferably reaches from about 15 to about 35 degrees below $T_p$, the preheated briquette is removed from the oven and repressed in Step DD in warm compaction tooling, which can be at about the same temperature as the briquette itself. Venting or evacuation can be used during either the compression or repressing steps.

Immediately after repressing, the hot blank 26 obtained at Step DD, can be cooled at Step EE for further processing at a later time or can be taken directly to another oven, for example, like that used in Step CC. Here, however, briquette 26 is placed in an oven or heater and kept there until the blank has a degree of melting of from about 20 to 90 percent. Normally, this will put the center of the blank at a temperature no greater than about 1 or 2 degrees below $T_p$, and no significant melt flow is occurring. The sintered briquette can then be forged (solid phase formed) at Step GG into a preform or article 28. A traditional thermoforming step can be added if preform 28 is not in the shape of the finished article at Step GG. For example, for typical high molecular weight high density polyethylene, the repress tooling can be heated to about 100°–135° C. Repress pressures are customarily between 3,000 and 10,000 psi with compaction for about 5 seconds or longer. Repress tool temperatures are not essentially critical provided the blank is not chilled before the repressing occurs. High repress tool temperatures, while possible, may be undesirable since the blank could stick to the compaction punches and would thus be hard to remove. However, silicone coating of the tooling surfaces or otherwise lubricating surfaces can significantly eliminate sticking.

A major difference between Method II of this invention and Method I of FIG. 1, is that the briquette before sintering is preheated and repressed in warm tooling. Purposefully, the repressing is not done at melt phase temperature so that no significant plasticizing occurs at the repressing step in this solid-phase forming process. Thus, the basic shape of the briquette is not changed during the repress operation. The repressing step serves to densify the briquette in a way that helps minimize voids, cracks or defects which might otherwise occur. This is done with a shorter sinter time. However, larger briquettes still tended to crack occasionally and the extra preheat time and equipment still is somewhat a disadvantage in manufacturing operations.

A process of this invention which is more rapid and can produce satisfactory large as well as small blanks, is that identified as Method III schematically illustrated in FIG. 3. Here, resinous powder 30 sufficient to make an article is gathered in Step AAA and compressed in Step BBB into a briquette 32 as in Method II described before. However, the sintering Step CCC occurs before the repressing Step DDD instead of afterwords eliminating at least one step in the process. The repressing and sintering can be done under substantially the same conditions as they are in Method II only in reverse order. An optional cooling Step EEE can be included should it be desired to forge the briquette 32 into a preform in Step FFF at a later date. Otherwise, the briquettes 32 from Step DDD are directly transferred to the forging apparatus of Step FFF for forging an article or preform. Subsequent thermoforming of the preform into a container can be achieved as in Method I, if desired.

Using Method III of this invention (FIG. 3), 50 and 100 gram 2½ inch diameter briquettes were again made from a high density polyethylene (HDPE) powder like that of Example I of U.S. Pat. No. 4,323,531, which is also identified as LP 51.1 by The Dow Chemical Company. Briquette was heated in a circulating air oven set to about 133°–137° C. in sintering Step CCC as shown in the Table below and then repressed at Step DDD in 130° C. compaction tooling with a vacuum applied before and during the compaction step. The cycle was relatively fast, 15 seconds vacuum and 15 seconds compaction at 10,000 psi. The 50 gram briquettes were heated for 80 minutes and the 100 gram briquettes for 120 minutes. After repressing, hot blanks formed from the briquettes were hand carried and placed in a 7¾ inch diameter forge tooling and forged. The conditions and results are summarized in the following Table 1.

TABLE 1

Appearance of Preforms Forged by Method III of this Invention

| Sinter Oven Temp. | Compaction Die Temp. 130° C. |
|---|---|
| 133° C. | 2 |
| | I |
| 135° C. | 4 |
| | IV |
| 137° C. | 4 |
| | V |

Nomenclature for Tables 1 and 2
1 or I Some small voids, incomplete lip.
2 or II Some small voids, complete lip.
3 or III Many large voids, complete lip.
4 or IV No voids, complete lip, excellent lip.
5 or V No voids, complete lip, overheated blank.
50 g HDPE LP 51.1 results are shown in Arabic Numerals
100 g HDPE LP 51.1 results are shown in Roman Numerals
Forging Conditions: 130° C. anvils, 1 second dwell at 100 tons.

For this particular material and tooling, 135° C. appeared to be the ideal oven temperature for sintering. Additional 150 gram forged preforms made at 135° had full well-defined lips, glossy surfaces, no thin spots and no voids. While lower repress die temperatures were not used in this run with high speed equipment and integrated tooling, it is expected that lower repress die temperatures can eliminate any sticking without chilling of the surface of the blank.

A series of additional tests were made with similar results. There seemed to be little difference between the 100 gram and the 50 gram blanks. Repressing the heated briquette in warm tooling under vacuum increased the density about 18%. When cooled, the repressed sample looked like a compression molding. It was firm, had glossy surfaces, had a convexed top and bottom surfaces and concave vertical surfaces. When these blanks were forced into preforms immediately after repressing, excellent preforms were obtained. The forged preforms were then formed into parts without difficulty. The parts were generally uniform in cross-sections and were free of voids. When a repressed briquette or blank was allowed to cool to room temperature and then reheated in an oven for a sufficient period of time, forged and formed a part with white blemishes resulted. However, these blemishes did not have the appearance of voids in the center. The cause of the difference is unknown.

It has been found that the quality of the forged preform improves as the compaction pressure used to make the precompacts increased from about 1000 to about 5000 psi. Above this pressure, little differences were found in processing times, although compaction pressures up to about 25,000 psi can make briquettes stronger and more abbrasion resistant.

It is desirable to keep the heating times to a minimum in production operations. The use of radio frequency (RF) to heat the interior of a sample and circulating air oven to heat the exterior surfaces has been employed with considerable success. It also possible to decrease heating times by using thin briquettes which are heated individually in a circulating air oven and then stacked upon one another to form the full weight blank. The only caution is that once the hot thin briquettes come in contact with one another, they stick so proper alignment must be maintained.

By the present invention hot briquettes are repressed without shaping and excellent void-free forged preforms can be made which can then be formed into high quality preforms or articles. If preforms, they can thereafter be thermoformed into containers and other products by conventional thermoforming techniques.

The high density polyethylene resin which as chosen for use in the practice of this invention is a fine, fluffy, low bulk density powder. It is usable in both the prior process of FIG. 1 and the process of this invention as shown in FIGS. 2 and 3. It has been considered formable with some difficulty but quite operable and practical. Other high-density polyethylene powders, including ultra-high molecular weight powders have been evaluated and have been found to form satisfactorily. When compacting such a material into a briquette heating and repressing it into a blank according to the present invention, a defect-free part can be satisfactorily forged and formed. This resin used in the specific examples can be compacted into a briquette using a cold compaction die and no vacuum. However, better results are often obtained when a warmer compaction die and some vacuum is used.

Some comparative tests were run of Methods I, II and III using a somewhat different resinous powder. Forty grams of ultra high molecular weight polyethylene (UHMW) powder produced by the Hoechst Corp. (Gur 212) were compacted into briquettes which were about 2.5 inches in diameter and about 1 inch high. The conditions were as follows:

Method I

A. The briquettes were sintered by placing them in a convection oven set at the peak melting temperature (143° C.) for 120 minutes.

Method II

A. The briquettes were preheated by placing them in a convection oven set at 110° C. for 60 minutes (about $T_p-33°$ C.).

B. They were then repressed under 10,000 psi for 15 seconds in tooling at 136° C.

C. The repressed briquettes were then cooled to room temperature.

D. Sintering was then done as in Method I, condition A, above.

Method III

A. The briquettes were sintered as in Method I condition A, above.

B. They were then repressed under 10,000 psi, for 15 seconds in tooling at 136° C.

Upon completion of each one of the Methods, the blanks were forged into 7.5 inch diameter disks between flat anvils at 136° C. by application of a pressure of 4500 psi. Tensile test specimens were then cut from these disks and tested according to standard ASTM methods. The results are presented below:

| Method | Elongation (%) | Strength (psi) | Modulus (psi) |
|---|---|---|---|
| I | 95 | 9,400 | 205,000 |
| II | 120 | 13,100 | 255,000 |
| III | 100 | 14,400 | 230,000 |

Tests of the three methods were also run at different heating cycles some of which produced unsatisfactory forgings because heating times were too short, or melted blanks because heating times were too long. The above shown test was selected to typify comparative results where essentially satisfactory forgings for all three methods were obtained. What it shows is that both Methods II and III resulted generally in forgings with better properties than those made by Method I with this particular material. Method II was found to yield somewhat better properties generally than Method III, but Method III still yields excellent properties and is less complex than Method II.

Figure 4:
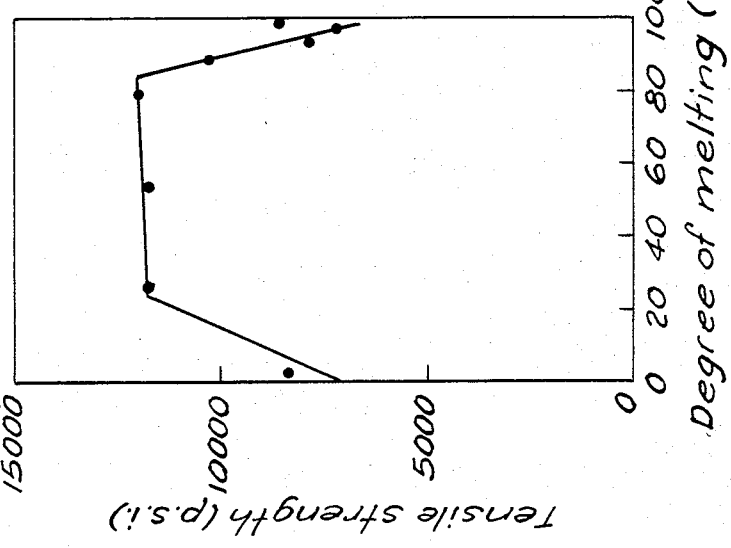
FIGS. 4 to 6 illustrate various mechanical properties of the products made by this invention as influenced by the sintering step.

The effect of the degree of melting during sintering on mechanical properties of a preform during solid-phase forming has been found to be significant. The process of sintering is a progressive one in which three stages may be identified. During the initial stage, the entire briquette is being heated to within a few degrees of $T_p$ or the melting range. Briquettes forged after sintering to this stage commonly produce grossly defective preforms in that they tend to not fill the mold, have very low values of ultimate extension and are generally quite cloudy due to incomplete fusion of the particles. In the second stage, when the degree of melting approaches about 20 percent, the particles at the exterior surface of the briquette become completely molten and begin conducting significantly more heat to the interior. Forgings produced from briquettes at this second stage are normally well-formed and have consistent physical properties. It has been discovered that if the sintering process is allowed to proceed to a third stage wherein one exceeds about 80 percent and approaches about 90 percent or so of the original crystallinity being melted, the physical properties normally change rapidly with further sintering. Ultimate elongation (FIG. 6) is increased significantly while modulus can be decreased by as much as 30 percent. The reasons for these dramatic changes in the final stage of sintering is not clear but may be related to a complete loss of the crystal morphology originally present in the powder. The effects of degree of melting during sintering on tensile strength, for example, are illustrated in FIG. 4. A preform, such as a preform 18, 28 or 34 of FIGS. 1 to 3, respectively, would have its tensile strength measured after forging where the degree of melting at the conclusion of the sintering step would be measured with the results shown in FIG. 4. It was discovered that the maximum tensile strength was reached when the degree of melting of the crystals in the samples was between about 20 and about 90 percent.

Figure 5:
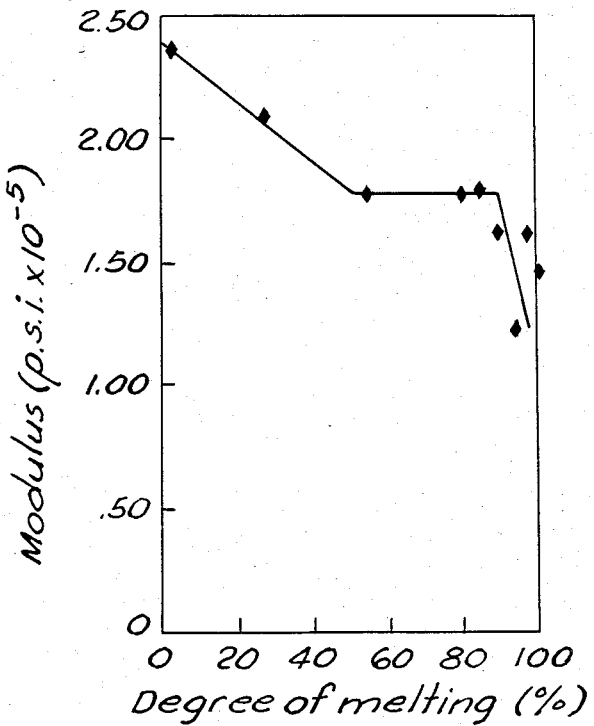

The tensile modulus of these same samples was also measured during the sintering process. From FIG. 5 is is evident that the modulus remained high until the degree of melting approached about 90 percent.

Figure 6:
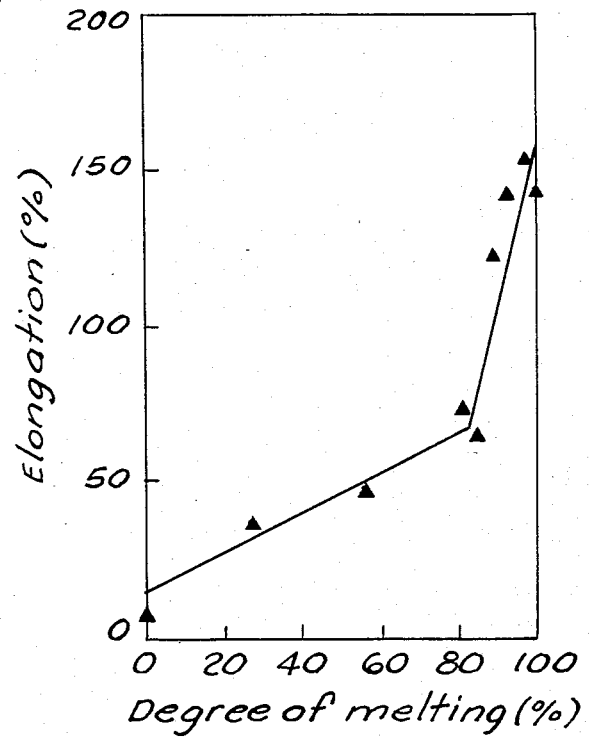

The tensile elongation of the samples was also measured and again it was found that a satisfactory level of elongation was achieved when the degree of melting approached about 20 percent until it approached about 90 percent, as evident from FIG. 6.

Balancing the most desirable tensile strength, tensile modulus and tensile elongation mechanical properties it is evident that the physical parameters are subject to rather little change and are in a satisfactory range at melting levels from about 20 to about 90 percent. When the degree of melting is in excess of about 90 percent, all three physical parameters were found to change dramatically. For example, between about 90 percent and 100 percent melting the ultimate elongation increased by a factor of 2 while the strength decreased by a factor of nearly ½. These observations have led to the conclusion that optical sintering conditions for powder briquettes of a nature similar to that of high density polyethylene in Method I as well as in Methods II and III of this present invention are such that degree of melting is between about 20 percent and about 90 percent. To insure maximum advantages of the processes of this invention, it may be preferable to sinter where the degree of melting achieved is from about b 40 to about 80 percent. When a forced air convection oven is used for heating, the oven temperatures can be set to about 3 degrees Centigrade above $T_p$ for faster heating cycles without hindering the process, but residence times for the preforms should not be such that $T_p$ is reached at the center of ths briquette.

With the present invention numerous materials heretofore not readily formable can be formed in a solid-phase system directly from many crystalline and perhaps some amorphous resinous powders into thermoplastic performs and articles. While certain representative embodiments and details have been shown for the purposes of illustrating the invention, it will be apparent to those skilled in the art that various changes and modifications can be made therein without departing from the spirit and scope of the invention.

What is claimed is:

1. A process for forming a plastic article from thermoplastic polymeric resinous powder wherein a sufficient quantity of said powder for making said article is compressed into a briquette having green strength, the improvement comprising the steps of:
   (a) preheating said briquette such that the center thereof is somewhat less than the melt temperature of the resinous powder forming the briquette,
   (b) repressing said briquette while at about the same temperature;
   (c) applying additional heat to said briquette such that the center thereof is at a temperature higher than that of step (a) but still less than said melt temperature,
   (d) maintaining said higher temperature for a period sufficient to soften said briquette and sinter the same short of complete melting thereof; and
   (e) forging the briquette into said article while the briquette is at a temperature within said temperature range to effect substantial plug flow deformation of the briquette and obtain substantial fusion of the powder forming said briquette.

2. The process of claim 1 wherein said preheating temperature at the center of the briquette is about 15 to about 35 degrees below the melt temperature of said resinous powder.

3. The process of claim 1 wherein the degree of melting which occurs during sintering step (d) is from about 20 percent to about 90 percent.

4. The process of claim 1 wherein the repressing of step (b) is done under a compaction pressure of about 1000 psi or more.

5. A process for forming a plastic article from thermoplastic polymeric resinous powder wherein a sufficient quantity of said powder for making said article is compressed into a briquette having green strength, the improvement comprising the steps of:
(a) heating said resinous powder to a temperature in the range from above room temperature to less than the melt temperature thereof and maintaining said temperature for a period sufficient to soften said briquette and sinter the same short of complete melting thereof;
(b) repressing said powder within said same temperature range; and
(c) forging the briquette into said article while the briquette is at a temperature within said temperature range to effect substantial plug flow deformation of the briquette and obtain substantial fusion of the powder forming said briquette.

6. The process of claim 5 wherein the degree of melting which occurs during sintering step (a) is from about 20 percent to about 90 percent.

7. The process of claim 5 wherein the repressing is done under a compaction pressure of about 1000 psi or more.

8. The process of claim 1 or 5 wherein after step (b) the briquette is allowed to cool to room temperature.

9. The process of claim 8 wherein the degree of melting is from about 40 percent to about 80 percent.

10. The process of claim 1 wherein heating is provided by radio frequency means for faster cycle times.

11. The process of claim 5 wherein heating is provided by radio frequency means far faster cycle times.

* * * * *

UNITED STATES PATENT AND TRADEMARK OFFICE
CERTIFICATE OF CORRECTION

PATENT NO. : 4,510,108

DATED : April 9, 1985

INVENTOR(S) : Kenneth J. Cleereman, et al.

It is certified that error appears in the above—identified patent and that said Letters Patent is hereby corrected as shown below:

Column 5, Table 1, line 5, under Table, "4 or IV No voids, complete lip, excellent lip." should read --4 or IV No voids, complete lip, excellent preform.--

Column 5, line 47, "forced" should read --forged--.

Column 8, line 12, "optical" should read --optimal--.

Column 8, line 19, "about b 40" should read --about 40--.

Column 8, line 30, "performs" should read --preforms--.

Signed and Sealed this

Fifteenth Day of October 1985

[SEAL]

Attest:

DONALD J. QUIGG

Attesting Officer

Commissioner of Patents and Trademarks—Designate